(12) United States Patent
Yamamura et al.

(10) Patent No.: US 8,953,194 B2
(45) Date of Patent: Feb. 10, 2015

(54) IMAGE FORMING APPARATUS

(71) Applicant: Konica Minolta, Inc., Chiyoda-ku (JP)

(72) Inventors: Akira Yamamura, Toyokawa (JP); Makoto Ooki, Toyohashi (JP); Takashi Kurosawa, Toyokawa (JP); Hideo Uemura, Toyokawa (JP); Masahiko Takahashi, Toyokawa (JP); Kazuki Ikeda, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/108,993

(22) Filed: Dec. 17, 2013

(65) Prior Publication Data

US 2014/0168725 A1   Jun. 19, 2014

(30) Foreign Application Priority Data

Dec. 19, 2012   (JP) .................... 2012-277221

(51) Int. Cl.
  *G06F 15/00*   (2006.01)
  *G06F 1/00*   (2006.01)
  *G06K 1/00*   (2006.01)
  *H04N 1/028*   (2006.01)
  *H04N 1/00*   (2006.01)
  *G06K 15/00*   (2006.01)

(52) U.S. Cl.
  CPC ....... *H04N 1/02815* (2013.01); *H04N 1/00005* (2013.01); *H04N 1/00015* (2013.01); *H04N 1/00031* (2013.01); *H04N 1/00047* (2013.01); *H04N 1/0005* (2013.01); *H04N 2201/0091* (2013.01)
  USPC .......................... 358/1.14; 358/1.1

(58) Field of Classification Search
  CPC .......... H04N 1/02815; H04N 1/00005; H04N 1/00015; H04N 1/00031; H04N 1/00047; H04N 1/0005; H04N 2201/0091
  USPC ................... 358/1.1, 1.14, 482, 483
  See application file for complete search history.

(56) References Cited

U.S. PATENT DOCUMENTS 6,728,008 B1   4/2004   Kamisuwa
8,310,583 B2 *   11/2012   Ohara et al. .................. 348/340
8,670,681 B2 *   3/2014   Hasegawa et al. ............. 399/15

FOREIGN PATENT DOCUMENTS

JP   64-061172 A   3/1989
JP   2000-184115 A   6/2000
JP   2006-082398 A   3/2006

* cited by examiner

*Primary Examiner* — Douglas Tran
(74) *Attorney, Agent, or Firm* — Buchanan Ingersoll & Rooney PC

(57) ABSTRACT

An image forming apparatus includes: an image reading mechanism configured to read an image from a document; an image forming mechanism configured to print the image read by the image reading mechanism on a recording sheet; and an image inspection mechanism configured to read the image printed on the recording sheet in the image forming mechanism. The image reading mechanism and the image inspection mechanism each include: a light source configured to irradiate a reading target with light; and a solid-state image sensing device on which reflected light from the reading target is made incident, and configured to perform photoelectric conversion operation. Light emitting members forming the light sources of the image reading mechanism and the image inspection mechanism have the same spectral characteristics.

7 Claims, 10 Drawing Sheets

IMAGE FORMING APPARATUS

CROSS-REFERENCE TO RELATED APPLICATIONS

This Nonprovisional application claims priority under 35 U.S.C. §119(a) on Patent Application No. 2012-277221 filed in Japan on Dec. 19, 2012, the entire contents of which are hereby incorporated by reference.

BACKGROUND OF THE INVENTION

1. Field of the Invention

The present invention relates to an image forming apparatus including an image reading mechanism that reads an image of a document and an image inspection mechanism that reads a printed image, in which in the image inspection mechanism, the printed image and the image of the document are compared, and thus a printing state is inspected.

2. Discussion of the Background

In conventional image forming apparatuses, a quality of a printed image varies over time or when the change in an environment such as temperature and humidity occurs. Thus, to prevent such a variation of the image quality, conventionally, a sensor has been provided, for example, that measures a toner density in a recording sheet after the printing. In the image forming apparatus with the sensor, for example, a toner discharge amount in a transfer unit is controlled based on the toner density measured by the sensor, and information obtained by the sensor is fed back to optimize the image forming process.

In recent years, due to a demand for high reproducibility of an image after the printing, image forming apparatuses including an image inspection mechanism have started to become popular. The image is again read from the printed recording sheet in the image inspection mechanism, and thus the printing state is inspected. As an example of the image forming apparatus including the image inspection mechanism, a printer connected to a print server through a network has been proposed (see Japanese Unexamined Patent Application Publication No. 2006-082398). The printer disclosed in Japanese Unexamined Patent Application Publication No. 2006-082398 prints on a recording sheet, an image based on document image data received from the print server through the network, and then reads the printed recording sheet with a line sensor (solid-state image sensing device). Then, a determination unit compares an inspection image data obtained by the line sensor with the document image data, and thus the printing state of the printer is inspected.

In the conventional image forming apparatuses provided with the image inspection mechanism including the printer disclosed in Japanese Unexamined Patent Application Publication No. 2006-082398, an optical system component in the image inspection mechanism is not configured to have a spectral characteristic that is the same as that of an optical system component for acquiring image data from a document image. Specifically, the printer disclosed in Japanese Unexamined Patent Application Publication No. 2006-082398 prints the document image data transmitted from the print server. Thus, the spectral characteristic of an optical system device used for generating document image data as a print target needs to be estimated, and the characteristics of any optical system components are difficult to optimize.

The image inspection mechanism includes, as optical system components, a light source for light radiated on a document as an image reading target, a solid-state image sensing device that converts reflected light from the document into an electrical signal, and an image forming optical system that forms an image in the solid-state image sensing device from the reflected light from the document. The spectral characteristics of the image inspection mechanism are determined by the spectral characteristics of an optical member including the light source and the image forming optical system and of the solid-state image sensing device. If the spectral characteristic of the optical system component is different between the image reading mechanism and the image inspection mechanism, a large difference in tint is produced between the inspection image data read by the image inspection mechanism and the document image data. Thus, a stable image quality cannot be obtained.

In the conventional image forming apparatus including the image reading mechanism and the image inspection mechanism, an image reading speed and an image reading width need to be different between the image reading mechanism and the image inspection mechanism to downsize the apparatus and achieve a low manufacturing cost. Due to the difference between the image reading mechanism and the image inspection mechanism in the spectral characteristics, reading speeds, and reading widths, an appropriate exposure amount for image reading cannot be obtained in the image inspection mechanism. If the reading speed of the image inspection mechanism is slow, the exposure amount from the light source is too large, thereby causing overexposure (saturation) in the image data. If the reading speed of the image inspection mechanism is fast, the exposure amount from the light source is insufficient, thereby causing noise such as underexposure in the image data. As described above, in the conventional image forming apparatus, the difference between the image reading mechanism and the image inspection mechanism in apparatus features has been a cause of deteriorating the accuracy of image forming process optimization based on the inspection on the printed image in the image inspection mechanism.

SUMMARY OF THE INVENTION

In view of the above problem, an object of the present invention is to provide an image forming apparatus in which the difference between an image reading mechanism and an image inspection mechanism in an apparatus feature is reduced so that a highly accurate image inspection can be performed.

To achieve the object, an image forming apparatus according to an embodiment of the present invention includes: an image reading mechanism configured to read an image from a document; an image forming mechanism configured to print the image read by the image reading mechanism on a recording sheet; and an image inspection mechanism configured to read the image printed on the recording sheet in the image forming mechanism. The image reading mechanism and the image inspection mechanism each include: a light source configured to irradiate a reading target with light; and a solid-state image sensing device on which reflected light from the reading target is made incident, and configured to perform photoelectric conversion operation. Light emitting members forming the light sources of the image reading mechanism and the image inspection mechanism have the same spectral characteristics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13A is a circuit diagram showing a first example, and FIG. 13B is a circuit diagram showing a second example;

DESCRIPTION OF THE PREFERRED EMBODIMENTS

Figure 1:
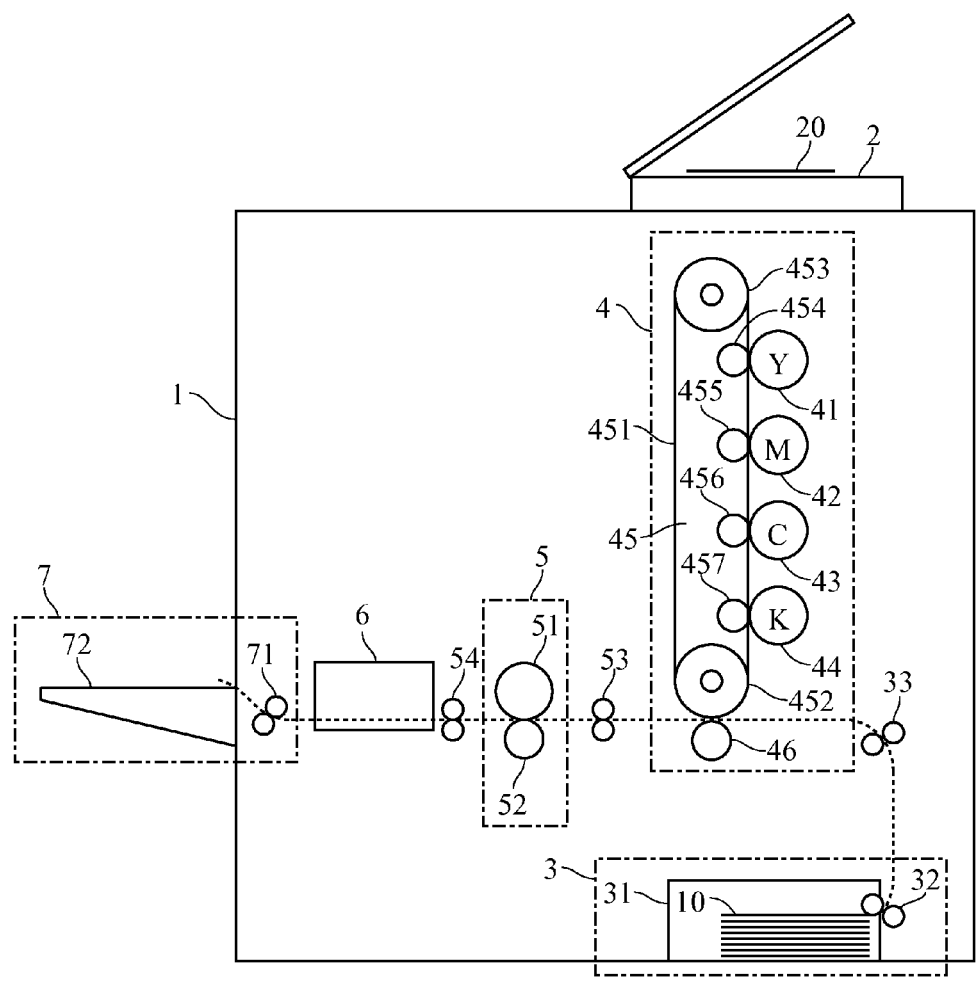
FIG. 1 is a schematic configuration diagram showing an internal configuration of an image forming apparatus as a basic configuration of the present invention.

Basic Configuration of Embodiments of the Present Invention

A basic configuration of embodiments of the present invention is described below with reference to drawings. In the drawings described below, the same or corresponding components are denoted with the same reference numerals. The basic configuration is described as a common configuration among the embodiments described below. The image forming apparatus of the present invention including the embodiments described below can be any apparatus including both image reading mechanism and image inspection mechanism, and thus may be, for example, a copier, a printer having a copying function, or a multi-function printer.

1. Machine Configuration of Image Forming Apparatus

Figure 2:
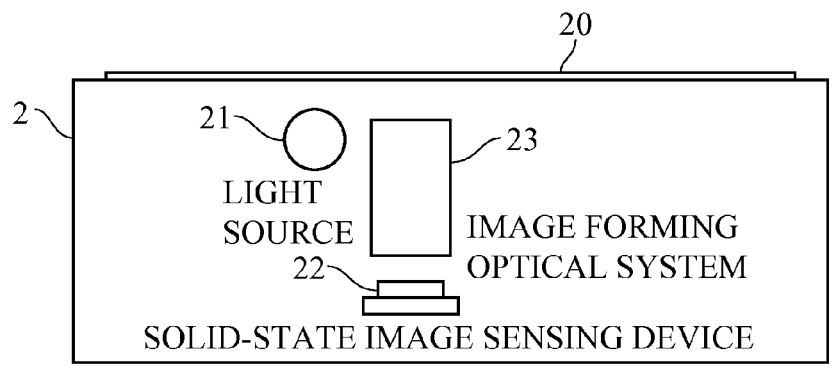
FIG. 2 is a block diagram showing a schematic configuration of an image reading mechanism in the image forming apparatus shown in FIG. 1.
Figure 3:
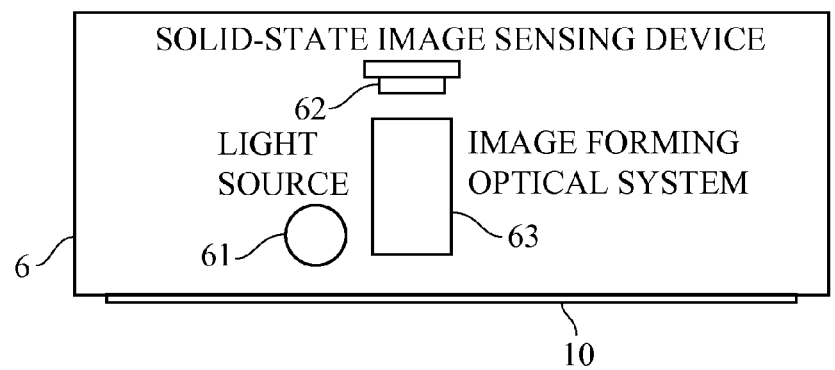
FIG. 3 is a block diagram showing a schematic configuration of an image inspection mechanism in the image forming apparatus shown in FIG. 1.

The machine configuration of an image forming apparatus 1 is described with reference to FIGS. 1 and 2. FIG. 1 is a schematic configuration diagram showing an internal configuration of the image forming apparatus 1. FIG. 2 is a block diagram showing a schematic configuration of an image reading mechanism 2 in the image forming apparatus 1 in FIG. 1. FIG. 3 is a block diagram showing a schematic configuration of an image inspection mechanism 6 in the image forming apparatus 1 in FIG. 1.

The image forming apparatus 1 shown in FIG. 1 includes the image reading mechanism 2, a sheet feeding mechanism 3, an image transfer mechanism 4, an image fixing mechanism 5, the image inspection mechanism 6, and a sheet discharging mechanism 7. The image reading mechanism 2 reads an image from a document 20. The sheet feeding mechanism 3 contains a recording sheet 10 on which the image is to be printed and feeds the recording sheet 10 into the image forming apparatus 1. The image transfer mechanism 4 transfers toner onto the recording sheet 10 based on document image data obtained by the image reading mechanism 2. The image fixing mechanism 5 fixes the toner transferred on the recording sheet 10 in the image transfer mechanism 4. The image inspection mechanism 6 inspects the printing state of the recording sheet 10 on which the image is formed by the toner fixing in the image fixing mechanism 5. The sheet discharging mechanism 7 discharges the printed recording sheet 10 after the inspection by the image inspection mechanism 6. In the configuration shown in FIG. 1, "image forming mechanism" is formed by the image transfer mechanism 4 and the image fixing mechanism 5.

As shown in the block diagram in FIG. 2, the image reading mechanism 2 includes a light source 21 that radiates light onto the document 20, a solid-state image sensing device 22 that receives the reflected light from the document 20 and converts the reflected light into an electrical signal, and an image forming optical system 23 that forms an image in the solid-state image sensing device 22 from the reflected light from the document 20. The image forming optical system 23 and the solid-state image sensing device 22 each include an element group in which a plurality of elements are arranged for each pixel in a direction (main-scanning direction) orthogonal to a reading direction (sub-scanning direction) of the document 20. The solid-state image sensing device 22 has a color filter of a primary or complementary color filter provided for a light receiving surface for each pixel, and thus reads an image on the document 20 as a color image as the element for each pixel receives the light transmitted through the color filter.

When reading an image from the document 20, the image reading mechanism 2 having the configuration described above irradiates the document 20 placed on a document positioning plate or conveyed from auto document feeder (ADF) with light from the light source 21. The reflected light from the document 20 is guided by a predetermined light path, and then is made incident on the solid-state image sensing device 22 through the image forming optical system 23. Thus, the solid-state image sensing device 22 outputs an electrical signal corresponding to the amount of light thus received for each line. The solid-state image sensing device 22 performs the reading operation at a predetermined interval corresponding to the reading width along the sub-scanning direction. Thus, two-dimensional document image data is generated based on the image on the document 20.

As shown in FIG. 1, the sheet feeding mechanism 3 includes a sheet feed cassette 31 that contains the recording sheet 10 on which an image is to be printed, and a pair of feeding rollers 32 that pick up the recording sheet 10 contained in the sheet feed cassette 31. A pair of conveyance rollers 33 that convey the recording sheet 10 fed from the sheet feed cassette 31 to a recording sheet conveyance path Q by the pair of sheet feed rollers 32 to the image transfer mechanism 4 are disposed on the downstream side of the sheet feeding mechanism 3. The recording sheet conveyance path Q is a conveyance path through which the recording sheet 10 on which the image is to be printed in the image forming mechanism is conveyed, and extends from the sheet feed cassette 31 to a discharge tray 72. In the sheet feeding mechanism 3 having the configuration described above, the pair of sheet feeding rollers 32 are drivingly rotated to pick up the recording sheet 10 contained in the sheet feed cassette 31 one at a time, and thus supplies the recording sheet 10 to the recording sheet conveyance path Q. The recording sheet 10 discharged from the sheet feed cassette 31 is conveyed to the image transfer mechanism 4 by the rotation of the conveyance rollers 33 on the downstream side of the sheet feeding mechanism 3 along the conveyance direction of the recording sheet.

The image transfer mechanism 4 includes photosensitive drums 41 to 44 on which electrostatic latent images of yellow (Y), magenta (M), cyan (C), and key tone (K) colors are respectively formed, an intermediate transfer unit 45 on which toner pieces of YMCK colors respectively carried by the photosensitive drums 41 to 44 are transferred, and a secondary transfer roller 46 that transfers the toner transferred on the intermediate transfer unit 45 onto the recording sheet 10. Although not shown in the figure, the photosensitive drums 41 to 44 respectively include, in the periphery thereof, chargers that respectively charge the photosensitive drums 41 to 44 by corona discharge and the like, exposure units that respectively irradiate the charged photosensitive drums 41 to 44 with laser light or the like so that an electrostatic latent image is formed, developers that respectively stirs the toner pieces of the YMCK colors so the toner pieces are charged and thus attach to the respective photosensitive drums 41 to 44, and cleaning members that remove the toner remaining on the respective photosensitive drums 41 to 44 after the transfer to the intermediate transfer unit 45.

The intermediate transfer unit 45 includes an intermediate transfer belt 451 on which the toner pieces of the YMCK colors are transferred from the photosensitive drums 41 to 44, a driving roller 452 and a driven roller 453 that rotate the intermediate transfer belt 451, and primary transfer rollers 454 to 457 that are respectively positioned opposite to the photosensitive drums 41 to 44 with the intermediate transfer belt 451 provided in between. The intermediate transfer unit 45 further includes an unillustrated cleaning member that removes the toner remaining on the intermediate transfer belt 451 without being transferred on the recording sheet 10 from the surface of the intermediate transfer belt 451. The secondary transfer roller 46 is positioned opposite to the driving roller 452 with the intermediate transfer belt 451 disposed in between.

In the image transfer mechanism 4 having the configuration described above, the electrostatic latent images of YMCK colors are respectively formed on surfaces of the photosensitive drums 41 to 44 based on the document image data acquired by the image reading mechanism 2, and then the charged toner pieces of the YMCK colors are carried on the electrostatic latent images of the respective photosensitive drums 41 to 44. In the intermediate transfer unit 45, the driving roller 452 rotates the intermediate transfer belt 451, and the toner pieces of the YMCK colors respectively carried by the photosensitive drums 41 to 44 are transferred onto the intermediate transfer belt 451 by the electrostatic force of the primary transfer rollers 454 to 457 to which a predetermined potential is applied.

Here, a portion of the intermediate transfer belt 451 on which the toner image to be transferred onto the recording sheet 10 is formed comes into contact with the photosensitive drums 41 to 44 in this order. Thus, the toner pieces of the YMCK colors are transferred from the photosensitive drum 41 to 44 in this order. Toner images of the YMCK colors on the surfaces of the photosensitive drums 41 to 44 are formed in the order of the photosensitive drums 41 to 44 at the timing at which the toner is transferred onto the intermediate transfer belt 451.

The toner images formed by transferring the toner pieces of YMCK colors onto the surface of the intermediate transfer belt 451 are transferred onto the recording sheet 10 nipped by the intermediate transfer belt 451 and the secondary transfer roller 46 when the portion of the intermediate transfer belt 451 on which the toner image is formed moves to the position facing the secondary transfer roller 46. The tonner images are transferred to the recording sheet 10 when a voltage is applied to the secondary transfer roller 46 so that the charged toner pieces of the respective colors are attracted to the secondary transfer roller 46. The recording sheet 10 on which the toner image is to be transferred is conveyed to the secondary transfer roller 46 by the sheet feeding mechanism 3. When a recording sheet reversing mechanism (not illustrated) that reverses the recording sheet 10 is provided more on the downstream side than the image fixing mechanism 5, the recording sheet 10 is conveyed from the secondary transfer roller 46 by the recording sheet reversing mechanism.

The image fixing mechanism 5 includes a heating roller 51 having a halogen lamp that heats the toner on the recording sheet 10 to fix the toner and a pressing roller 52 that nips and presses the recording sheet 10 together with the heating roller 51. The recording sheet 10 on which the toner image are transferred in the image transfer mechanism 4 is guided by a pair of conveyance rollers 53 and the like disposed between the image transfer mechanism 4 and the image fixing mechanism 5 to be conveyed to the image fixing mechanism 5. The recording sheet 10 on which the toner images are transferred is heated by the heating roller 51 and pressed by the heating roller 51 and the pressing roller 52 while passing between the heating roller 51 and the pressing roller 52. Thus, the transferred toner images are fixed on the recording sheet 10, and thus the image based on the document image data is printed on the recording sheet 10. The surface of the heating roller 51 may be heated by producing an eddy current on the surface by electromagnetic induction.

As shown in the block diagram in FIG. 3, like the image reading mechanism 2 in FIG. 2, the image inspection mechanism 6 includes a light source 61 that radiates light onto the recording sheet 10 on which the image is printed, a solid-state image sensing device 62 that receives the reflected light from the recording sheet 10 and converts the reflected light into an electrical signal, and an image forming optical system 63 that forms an image in the solid-state image sensing device 62 from the reflected light from the recording sheet 10. A pair of conveyance rollers 54 disposed between the image fixing mechanism 5 and the image inspection mechanism 6 as shown in FIG. 1 convey the recording sheet 10 discharged from the image fixing mechanism 5 to the image inspection mechanism 6 and then the recording sheet 10 passes through the image inspection mechanism 6.

The light source 61, the solid-state image sensing device 62, and the image forming optical system 63 of the image inspection mechanism 6 perform the operations that are same as those of the counterparts in the image reading mechanism 2, and thus the image printed on the recording sheet 10 is read by the image inspection mechanism 6. Inspection image data for determining the printing state is generated based on the image read by the image inspection mechanism 6. The inspection image data thus generated is compared with the document image data acquired in the image reading mechanism 2 in an image processing mechanism 8 (see FIG. 4) described later, and thus the printing state on the recording sheet 10 is determined.

The sheet discharging mechanism 7 includes a pair of discharging rollers 71 that discharge the recording sheet 10 that has passed through the image inspection mechanism 6 for generating the inspection image data to the outside of the image forming apparatus 1 and the discharge tray 72 that is disposed outside of the image forming apparatus 1 and receives the recording sheet 10 discharged by the discharge rollers 71. In the sheet discharging mechanism 7 having the configuration described above, the discharge rollers 71 are driven so that the recording sheet 10 on which the image is printed is guided from the image inspection mechanism 6 to be discharged to the discharge tray 72 outside the image forming apparatus 1.

2. Functional Configuration of Image Forming Apparatus

Figure 4:
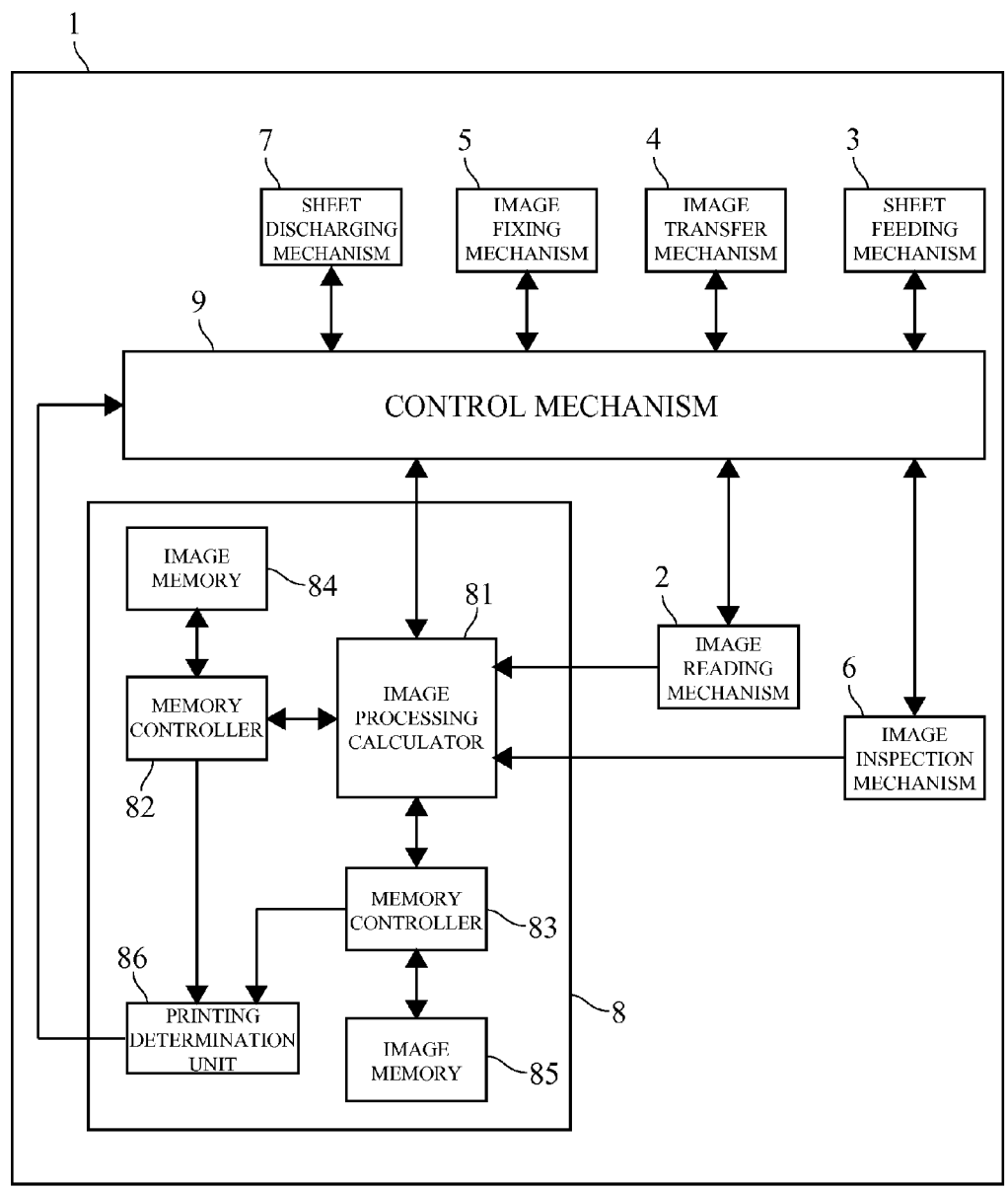
FIG. 4 is a block diagram showing a functional configuration of the image forming apparatus shown in FIG. 1.

A functional configuration of the image forming apparatus 1 having the machine configuration described above is described with reference to FIG. 4. FIG. 4 is a block diagram showing the functional configuration of the image forming apparatus 1 illustrated in FIG. 1. In the block diagram shown in FIG. 4, the configuration is described mainly based on the image reading mechanism 2 and the image inspection mechanism 6 used as a determination function of the printing state, and configurations of peripheral mechanisms are not illustrated. The peripheral mechanisms include a power source mechanism that performs voltage conversion to put commercial power supply into the mechanisms, an operation input mechanism for operating the image forming apparatus 1, and a communication control mechanism connected to a phone line and a network line.

As shown in FIG. 4, the image forming apparatus 1 includes the image processing mechanism 8 and a control mechanism 9. The image processing mechanism 8 receives an electrical signal output from each of the image reading mechanism 2 and the image inspection mechanism 6 and generates the document image data and the inspection image data. The control mechanism 9 controls operations of the mechanisms 2 to 8 in the image forming apparatus 1.

The image processing mechanism 8 includes an image processing calculator 81, memory controllers 82 and 83, image memories 84 and 85, and a printing determination unit 86. The image processing calculator 81 receives an electrical signal transmitted from the respective solid-state image sensing devices 22 and 62 of the image reading mechanism 2 and the image inspection mechanism 6 to generate two-dimensional image data, and performs various image processing such as shading correction processing and gamma correction processing. The memory controller 82 writes and reads out the document image data generated in the image processing calculator 81 to and from the image memory 84. The memory controller 83 writes and reads out the inspection image data generated in the image processing calculator 81 to and from the image memory 85. The image memories 84 and 85 respectively store therein the document image data and the inspection image data temporarily. The printing determination unit 86 determines the printing state by comparing the document image data and the inspection image data respectively stored in the image memories 84 and 85.

While the image reading mechanism 2 is performing the reading operation on the document image, the image processing mechanism 8 having the configuration described above receives an electrical signal output from the solid-state image sensing device 22 of the image reading mechanism 2 moving in the sub-scanning direction for each line. Here, the image processing calculator 81 receives electrical signals of pixels serially arranged in the main-scanning direction from the solid-state image sensing device 22 of the image reading mechanism 2 as an electrical signal of a single line. From the reading timing, the position of the line of the electrical signal in the sub-scanning direction is recognized. Thus, in the image processing calculator 81, a pixel position in the document 20 to be read is recognized from the electrical signals of the pixels received from the solid-state image sensing device 22 of the image reading mechanism 2. The data is temporarily stored in the image memory 84 by the memory controller 82 with an address position of the image memory 84 corresponding to the recognized pixel position being designated.

The image processing calculator 81 reads out the electrical signal corresponding to the document image temporarily stored in the image memory 84 through the memory controller 82, and performs filter processing suitable for various image processing. Thus, the document image data for printing the image onto the recording sheet 10 is generated. The document image data may be formed of image data pieces separated for each of YMCK colors by filter processing by the image processing calculator 81. The document image data based on the image read out from the document 20 in the image reading mechanism 2 thus generated is stored in the image memory 84 by the memory controller 82.

The document image data thus stored in the image memory 84 is read out by the memory controller 82 to be transmitted to the image transfer mechanism 4. Thus, the image transfer mechanism 4 forms the electrostatic latent images of the YMCK colors onto the surfaces of the respective photosensitive drums 41 to 44 based on the document image data provided by the image processing mechanism 8. Thus, the image transfer mechanism 4 transfers the toner images of the YMCK colors based on the document image data on the intermediate transfer belt 451, and then transfers the toner images onto the recording sheet 10 passing through the secondary transfer roller 46.

When the image inspection mechanism 6 performs the reading operation on the image printed on the recording sheet 10, the solid-state image sensing device 62 of the image inspection mechanism 6 reads out an image on the recording sheet 10 moving in the sub-scanning direction. Thus, the image processing mechanism 8 receives an electrical signal outputted from the solid-state image sensing device 62 for each line. Then, the image processing calculator 81 of the image processing mechanism 8 performs an operation that is the same as the that for generating the document image data based on the electrical signal from the solid-state image sensing device 22, and thus generates the inspection image data based on the electrical signal from the solid-state image sensing device 62. When the inspection image data is generated, the image processing calculator 81 causes the memory controller 83 to store the inspection image data and the electrical signal received from the solid-state image sensing device 62 in the image memory 85, unlike in the case where the document image data is generated.

When the inspection image data is thus stored in the image memory 85, the document image data and the inspection image data stored in the image memories 84 and 85 are read out by the memory controllers 82 and 83 respectively, to be transmitted to the printing determination unit 86. The printing determination unit 86 receives the document image data and the inspection image data, and then performs calculation processing to compare the document image data and the inspection image data, thereby determining whether the printing state on the recording sheet 10 is fine or failed.

The control mechanism 9 includes, for example, a Central Processing Unit (CPU) that performs various calculation processing and control, a Read Only Memory (ROM) that stores therein a control program and the like, and a Random Access Memory (RAM) that temporarily stores therein calculation data.

The control mechanism 9 controls the light sources 21 and 61 and the solid-state image sensing devices 22 and 62 of the image reading mechanism 2 and the image inspection mechanism 6 respectively, and thus controls the image reading operations in the image reading mechanism 2 and the image inspection mechanism 6. The control mechanism 9 controls the pair of feeding rollers 32 and the pair of conveyance rollers 33 of the sheet feeding mechanism 3, and thus controls the sheet feeding operation for the recording sheet 10 performed by the sheet feeding mechanism 3. The control mechanism 9 controls the photosensitive drums 41 to 44, the intermediate transfer unit 45, and the secondary transfer roller 46 of the image transfer mechanism 4, and thus controls the operation of transferring the toner images onto the recording sheet 10 in the image transfer mechanism 4. The control mechanism 9 controls the heating roller 51 and the pressing roller 52 of the image fixing mechanism 5, and thus controls the operation of fixing the image on the recording sheet 10 in the image fixing mechanism 5. The control mechanism 9 controls the pair of discharging rollers 71 in the sheet discharging mechanism 7, and thus controls the operation of discharging the recording sheet 10 in the sheet discharging mechanism 7. The control mechanism 9 controls the image processing calculator 81, the memory controllers 82 and 83, and the printing determination unit 86 of the image processing mechanism 8, and thus controls the operations of generating the image data of various types and determining the printing state in the image processing mechanism 8.

Thus, the image forming apparatus 1 prints the image on the document 20 onto the recording sheet 10 as the control mechanism 9 that controls the operations of the mechanisms 2 to 8 controls the units in the mechanisms 2 to 8 in accordance with the timing based on the stored program.

3. Configuration for Performing Highly Accurate Image Inspection

The image forming apparatus 1 determines the printing state by performing the image inspection with the image inspection mechanism 6 as described above. To perform the image inspection with the image inspection mechanism 6 with higher accuracy, a configuration is provided where the difference between the image reading mechanism 2 and the image inspection mechanism 6 in the spectral characteristic is reduced. To reduce the difference between the image reading mechanism 2 and the image inspection mechanism 6 in the spectral characteristic, light emitting and receiving members that determine the spectral characteristic of the image reading mechanism 2 and light emitting and receiving members that determine the spectral characteristic of the image inspection mechanism 6 are formed of members having similar spectral characteristics.

To reduce the difference in the spectral characteristic between the respective light emitting members of the image reading mechanism 2 and the image inspection mechanism 6, the light sources 21 and 61 are formed of the same light emitting element. If the respective light emitting elements of the light sources 21 and 61 have the similar spectral characteristics, light beams to be radiated onto the target of the image reading have the same luminous distribution and color distribution. Thus, the colors developed from the same target are likely to be determined as the same color. Instead of the light sources 21 and 61, the image forming optical systems 23 and 63 may be respectively formed of optical lenses or optical elements with similar spectral characteristics. Here, the same color components can be blocked by the image forming optical systems 23 and 63. Thus, the light beams respectively made incident on the solid-state image sensing devices 22 and 62 can have substantially the same spectral characteristics when the light emitting elements of the respective light sources 21 and 61 and/or the optical components of the respective image forming optical systems 23 and 63 are the same.

By reducing the difference between the image reading mechanism 2 and the image inspection mechanism 6 in the spectral characteristics determined by their respective light receiving components, of the components forming the solid-state image sensing devices 22 and 62 of the image reading mechanism 2 and the image inspection mechanism 6, at least the color filters and the photoelectric conversion elements (photodiode and phototransistor) are the same. The spectral characteristics of the solid-state image sensing devices 22 and 62 are determined by the color filter and the photoelectric conversion element. The ranges of the color components subjected to the photoelectric conversion by the image reading mechanism 2 and the image inspection mechanism 6 can be made substantially the same when the color filters and the photoelectric conversion elements with similar spectral characteristics are used.

In the following embodiments, image forming apparatuses having the basic structure of the image forming apparatus 1 described above are described, and more specifically, the configuration for achieving the highly accurate image inspection is described more in detail. Thus, in the embodiments described below, the configurations are described mainly based on the image reading mechanism 2 and the image inspection mechanism 6.

<First Embodiment>

Figure 5:
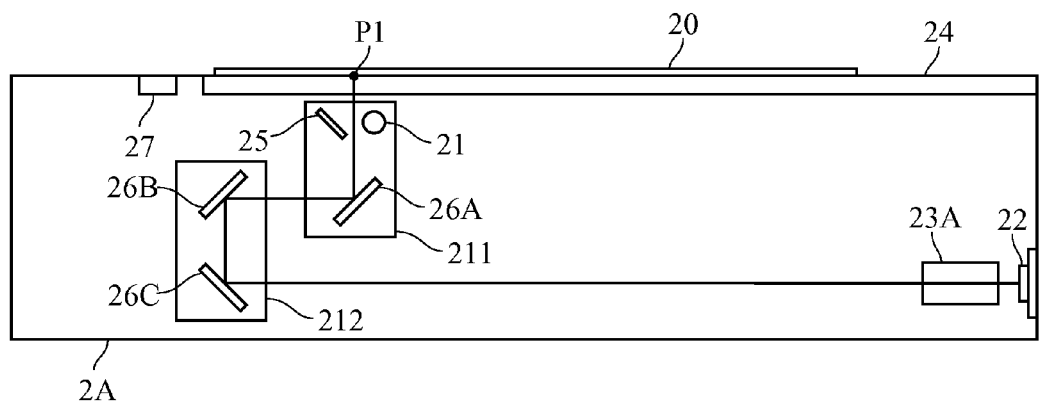
FIG. 5 is a schematic diagram showing a configuration of an image reading mechanism in an image forming apparatus according to a first embodiment of the present invention.
Figure 6:
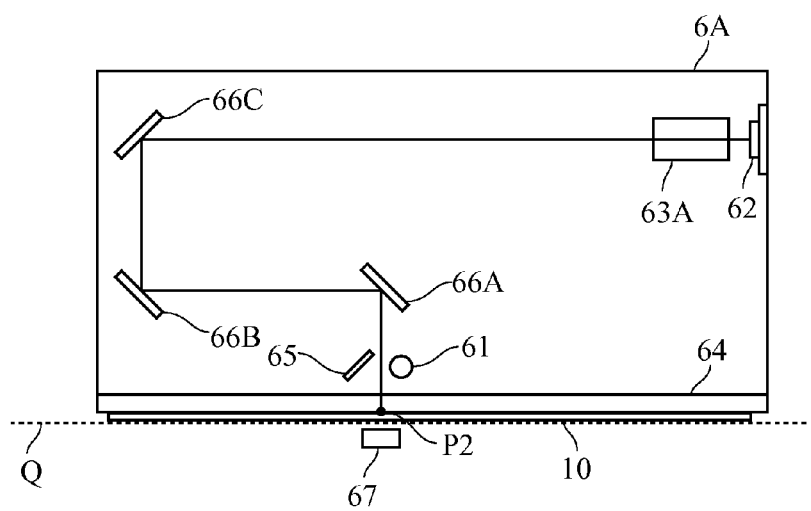
FIG. 6 is a schematic diagram showing a configuration of an image inspection mechanism in the image forming apparatus according to the first embodiment of the present invention.

An image forming apparatus according to a first embodiment of the present invention is described with reference to drawings. FIG. 5 is a diagram showing a configuration of an image reading mechanism in the image forming apparatus of the first embodiment. FIG. 6 is a diagram showing a configuration of an image inspection mechanism in the image forming apparatus of the first embodiment.

The image forming apparatus of the first embodiment has the machine configuration shown in FIG. 1 and the functional configuration in FIG. 4 in the basic configuration described above, and the feature thereof lies in the image reading mechanism and the image inspection mechanism. An image reading mechanism 2A in FIG. 5 corresponds to the image reading mechanism 2 in FIGS. 1 and 4. An image inspection mechanism 6A in FIG. 6 corresponds to the image inspection mechanism 6 in FIGS. 1 and 4. In the configurations shown in FIGS. 5 and 6, portions that are the same as the counterparts in FIGS. 2 and 3 are denoted with the same reference numerals and will not be described in detail.

As shown in FIG. 5, the image reading mechanism 2A of the image forming apparatus 1 of the first embodiment includes the light source 21, the solid-state image sensing device 22, an image forming lens 23A as a reducing optical system (corresponding to the image forming optical system 23 in FIG. 2), a document glass plate 24 on which the document 20 is placed, a first reflecting mirror 25 that reflects light from the light source 21 so that the light is radiated onto the surface of the document 20, second to fourth reflecting mirrors 26A to 26C that guide the reflected light from the document 20 to the image forming lens 23A, and a white reference plate 27 for generating a correction value used in the shading correction.

The image reading mechanism 2A includes a first slider unit 211 that moves the light source 21 and the first and the second reflecting mirrors 25 and 26A in the sub-scanning direction and a second slider unit 212 that moves the third and the fourth reflecting mirrors 26B and 26C in the sub-scanning direction. The document 20 placed on the document glass plate 24 is read in the sub-scanning direction as the first and the second slider units 211 and 212 simultaneously are moved in the sub-scanning direction by an unillustrated movement mechanism such as a rail and a motor. The image reading mechanism 2A includes a casing having a surface provided with the document glass plate 24. In the casing, the solid-state image sensing device 22, the image forming lens 23A, and the white reference plate 27 are secured, and the first and the second slider units 211 and 212 are contained.

When the image of the document 20 is read in the image reading mechanism 2A having the configuration described above, the first slider unit 211 irradiates a reading position P1 of the document 20 with the irradiation light from the light source 21 and the reflected light from the first reflecting mirror 25, and thus the reflected light as the radiated light reflected from the document 20 is made incident on the second reflecting mirror 26A of the first slider unit 211. The reflected light from the second reflecting mirror 26A is reflected by the third and the fourth reflecting mirrors 26B and 26C of the second slider unit 212 in order to be guided to the image forming lens 23A. The reflected light from the document 20 transmits through the image forming lens 23A, and thus the image of the reading position P1 of the document 20 is formed in an imaging region of the solid-state image sensing device 22.

The image reading mechanism 2A moves the first and the second slider units 211 and 212 so that the first slider unit 211 is positioned right beneath the white reference plate 27, and thus performs a reading operation on the white reference plate 27 before performing the reading operation on an image of the document 20. Thus, the image processing mechanism 8 (see FIG. 4) can generate a correction value for performing the shading correction of the output value of the electrical signal output from the solid-state image sensing device 22 in the main-scanning direction. Thus, in the image processing mechanism 8, variation of amounts of light from the light source 21 in the main-scanning direction can be prevented by performing the shading correction based on the correction value on the electrical signal output from the solid-state image sensing device 22.

As shown in FIG. 6, the image inspection mechanism 6A includes the light source 61, the solid-state image sensing device 62, an image forming lens 63A as a reducing optical system (corresponding to the image forming optical system 63 in FIG. 3), a glass plate 64 with which an image recording surface of the recording sheet 10 that moves in the sub-scanning direction (corresponding to the conveyance direction in the recording sheet conveyance path Q) is in contact, a first reflecting mirror 65 that reflects light from the light source 61 so that the light is radiated onto the surface of the recording sheet 10, second to fourth reflecting mirrors 66A to 66C that guide the reflected light from the recording sheet 10 to the image forming lens 63A, and a white reference plate 67 for generating a correction value used in the shading correction. Unlike the image reading mechanism 2A, the image inspection mechanism 6A includes a casing having a surface on the side of the recording sheet conveyance path Q covered by the glass plate 64. In the casing, the light source 61, the solid-state image sensing device 62, the image forming lens 63A, and the first to the fourth reflecting mirrors 65 and 66A to 66C are secured, and the white reference plate 67 is secured at a position right beneath the second reflecting mirror 66A with the recording sheet conveyance path Q provided in between.

When the image of the recording sheet 10 is read in the image inspection mechanism 6A having the configuration described above, a reading position P2 of the recording sheet 10 is irradiated with the irradiation light from the light source 61 and the reflected light from the first reflecting mirror 65, and thus the reflected light as the radiated light reflected from the recording sheet 10 is made incident on the second reflecting mirror 66A. The reflected light from the second reflecting mirror 66A is reflected by the third and the fourth reflecting mirrors 66B and 66C to be guided to the image forming lens 63A. Thus, the image of the reading position P2 of the recording sheet 10 is formed in an imaging region of the solid-state image sensing device 62. The image inspection mechanism 6A performs the reading operation on the white reference plate 67 before performing the reading operation on the image of the recording sheet 10. Thus, in the image processing mechanism 8 (see FIG. 4), variation of amounts of light from the light source 61 in the main-scanning direction can be prevented by performing the shading correction on the electrical signal output from the solid-state image sensing device 62.

In the image inspection mechanism 6A, the light source 61 includes a light emitting element having a spectral characteristic that is equivalent to that of the light source 21 of the image reading mechanism 2A. Thus, the luminous distribution and the color distribution of the irradiation light from the light source 61 can be made substantially the same as those of the irradiation light from the light source 21. Thus, if the document 20 and the recording sheet 10 are the same sheet of paper, the luminous distribution and the color distribution can be made substantially the same between the reflected light from the document 20 and the reflected light from the recording sheet 10. The respective first reflecting mirrors 25 and 65 of the image reading mechanism 2A and the image inspection mechanism 6A have the same reflectance ratio and the angle of reflection. Thus, the reflected light beams obtained by the irradiation light beams from the light sources 21 and 61 can be respectively radiated onto the document 20 and the recording sheet 10 as the light beams having the same spectral characteristics. Here, the light sources 21 and 61 as well as the first reflecting mirrors 25 and 65 are disposed in such a manner that the positional relationship of the light source 21 and the first reflecting mirror 25 with respect to the reading position P1 and the positional relationship of the light source 61 and the first reflecting mirror 65 with respect to the reading position P2 are the same.

In the image inspection mechanism 6A, the image forming lens 63A is formed of a component having the spectral transmittance that is the similar to that of the image forming lens 23A in the image reading mechanism 2A. Thus, the luminous distribution and the color distribution of the light transmitted through the image forming lens 63A can be made substantially the same as those of the light transmitted through the image forming lens 23A. Furthermore, in the image inspection mechanism 6A, the reflectance ratio and the angle of reflection of each of the second to the fourth reflecting mirrors 66A to 66C are made equal to those of the corresponding one of the second to the fourth reflecting mirrors 26A to 26C of the image reading mechanism 2A. Thus, the light incident on the image forming lens 63A can have the spectral characteristic that is the same as that of the light incident on the image forming lens 23A. Here, the second to fourth reflecting mirrors 26A to 26C and 66A to 66C and the image forming lenses 23A and 63A are disposed in such a manner that an optical length from the reading position P1 to the solid-state image sensing device 22 is set to be equal to an optical length from the reading position P2 to the solid-state image sensing device 62.

In the image inspection mechanism 6A, the solid-state image sensing device 62 is formed of elements having the spectral sensitivity characteristic that is the same as those of the solid-state image sensing device 22 of the image reading mechanism 2A. With such a configuration, the light beams as targets of the photoelectric conversion in the solid-state image sensing devices 22 and 62 as the light receiving components in the image reading mechanism 2A and the image inspection mechanism 6A can have the same luminous distribution and the same color distribution. Here, the image reading mechanism 2A and the image inspection mechanism 6A can have approximately the same spectral characteristics when the light sources 21 and 61, the image forming lenses 23A and 63A, the first to the fourth reflecting mirrors 25, and 26A to 26C and 65 and 66A to 66C in the image reading mechanism 2A and the image inspection mechanism 6A are formed of the same components.

As described above, when the components of the image reading mechanism 2A and the image inspection mechanism 6A have the same spectral characteristics, the spectral characteristics can be easily made equal between the document image data and the inspection image data in the image processing mechanism 8 (FIG. 4) even when the reading speed in the image reading mechanism 2A based on the movement speed of the slider units 211 and 212 is different from the reading speed of the image inspection mechanism 6A based on the conveyance speed of the recording sheet 10 through the correction calculation processing based on the difference between the reading speeds. The difference between the solid-state image sensing devices 22 and 62 in an exposure amount (exposure time) caused by the difference in the reading speed can be compensated by image calculation processing in the image processing mechanism 8. For example, for the document image data or the inspection image data, luminous distribution correction may be performed on the output from the solid-state image sensing device 22 or 62 in the image processing mechanism 8 based on the difference in the exposure amount. The image inspection can be carried out with higher accuracy with the inspection image data obtained by the image inspection mechanism 6A through such an image calculation processing.

<Second Embodiment>

Figure 7:
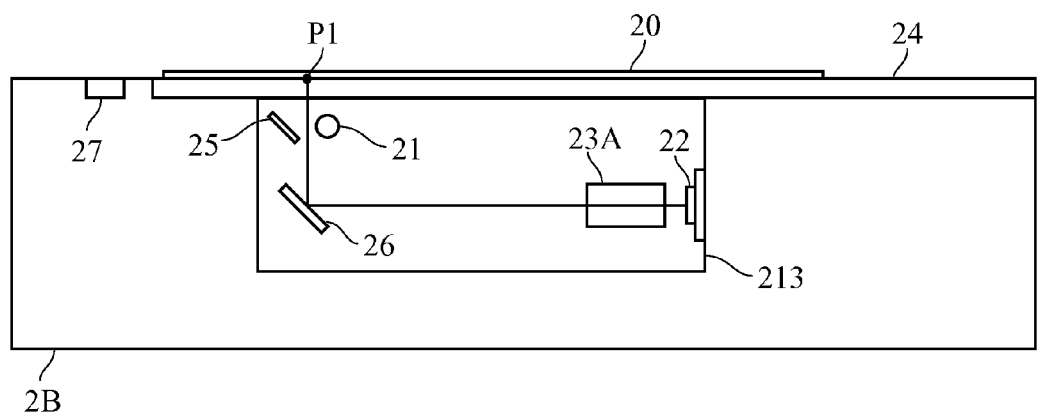
FIG. 7 is a schematic diagram showing a configuration of an image reading mechanism in an image forming apparatus according to a second embodiment of the present invention.
Figure 8:
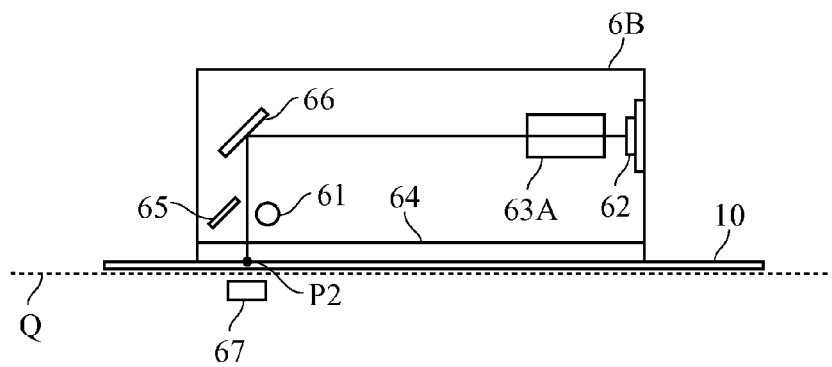
FIG. 8 is a schematic diagram showing a configuration of an image inspection mechanism in the image forming apparatus according to the second embodiment of the present invention.

An image forming apparatus of a second embodiment of the present invention is described below with reference to drawings. FIG. 7 is a diagram showing a configuration of an image reading mechanism in the image forming apparatus of the second embodiment. FIG. 8 is a diagram showing a configuration of an image inspection mechanism in the image forming apparatus of the second embodiment.

As shown in FIG. 7, an image reading mechanism 2B provided in the image forming apparatus 1 of the second embodiment includes the light source 21, the solid-state image sensing device 22, the image forming lens 23A, the document glass plate 24, the first reflecting mirror 25, the white reference plate 27, and the second reflecting mirror 26 that guides the reflected light from the document 20 to the image forming lens 23A. The light source 21, the solid-state image sensing device 22, the image forming lens 23A, the first and the second reflecting mirrors 25 and 26 are contained in a slider unit 213 moved in the sub-scanning direction by the unillustrated movement mechanism such as a rail and a motor. The image reading mechanism 2B includes a casing having a surface provided with the document glass plate 24. In the casing, the white reference plate 27 is secured and the slider unit 213 is contained.

When the image of the document 20 is read in the image reading mechanism 2B having the configuration described above, as in the image reading mechanism 2A in the first embodiment (see FIG. 5), the reading position P1 of the document 20 is irradiated with the irradiation light from the light source 21 and the reflected light from the first reflecting mirror 25 from the slider unit 213, and thus the reflected light as the radiated light reflected from the document 20 is made incident on the second reflecting mirror 26 of the slider unit 213 to be guided to the image forming lens 23A. The reflected light from the document 20 transmits through the image forming lens 23A, and thus the image of the reading position P1 of the document 20 is formed in an imaging region of the solid-state image sensing device 22. In the image reading mechanism 2B, as in the image reading mechanism 2A in the first embodiment (see FIG. 5), the reading operation is performed on the white reference plate 27 before the reading operation on the image on the document 20 for the shading correction in the image processing mechanism 8 (see FIG. 4).

As shown in FIG. 8, an image inspection mechanism 6B includes the light source 61, the solid-state image sensing device 62, the image forming lens 63A, the glass plate 64, the first reflecting mirror 65, the white reference plate 67, and the second reflecting mirror 66 that guides the reflected light from the recording sheet 10 to the image forming lens 63A. Unlike the image reading mechanism 2B, the image inspection mechanism 6B includes a casing having a surface on the side of the recording sheet conveyance path Q covered by the glass plate 64. In the casing, the light source 61, the solid-state image sensing device 62, the image forming lens 63A, and the first and the second reflecting mirrors 65 and 66 are secured, and the white reference plate 67 is secured at a position right beneath the second reflecting mirror 66 with the recording sheet conveyance path Q provided in between.

When the image of the recording sheet 10 is read in the image reading mechanism 6B having the configuration described above, the reading position P2 of the recording sheet 10 is irradiated with the irradiation light from the light source 61 and the reflected light from the first reflecting mirror 65, and thus the reflected light as the radiated light reflected from the recording sheet 10 is made incident on the second reflecting mirror 66. The reflected light from the second reflecting mirror 66 transmits through the image forming lens 63A, and thus the image of the reading position P2 of the recording sheet 10 is formed in an imaging region of the solid-state image sensing device 62. The image inspection mechanism 6A performs the reading operation on the white reference plate 67 before performing the reading operation on the image of the recording sheet 10. Thus, in the image processing mechanism 8 (see FIG. 4), variation of amounts of light from the light source 61 in the main-scanning direction can be prevented by performing the shading correction on the electrical signal output from the solid-state image sensing device 62.

In the second embodiment, the light sources 21 and 61 are formed of the light emitting elements having the same spectral characteristic as in the first embodiment. Thus, the spectral characteristics of the irradiation light beams on the document 20 and the recording sheet 10 can be made equal. Here, the first reflecting mirrors 25 and 65 preferably have the same reflectance ratio and the angle of reflection so that the spectral characteristics of the radiation light beams from the first reflecting mirrors 25 and 65 are made equal. The light sources 21 and 61 as well as the first reflecting mirrors 25 and 65 are disposed to have the same positional relationship with respect to the reading positions P1 and P2.

The image forming lenses 23A and 63A have the same spectral transmittance as in the first embodiment, and thus the spectral characteristics of the light beams that transmit through the solid-state image sensing devices 22 and 62 can be made equal. The reflectance ratios and the angles of reflection of the second reflecting mirrors 26 and 66 are preferably set to be equal so that the spectral characteristics of the reflected light beams from the second reflecting mirrors 26 and 66 become equal. The image forming lenses 23A and 63A as well as the second reflecting mirrors 26 and 66 are disposed to have the same positional relationship with respect to the reading positions P1 and P2.

The solid-state image sensing devices 22 and 62 are formed of elements having the same spectral sensitivity characteristic as in the first embodiment, and thus the light beams converted into electrical signals in the solid-state image sensing devices 22 and 62 can have the same spectral characteristic.

As described above, the components of the image reading mechanism 2B and the image inspection mechanism 6B in the second embodiment have the same spectral characteristics as in the first embodiment. Thus, the spectral characteristics of the document image data from the image reading mechanism 2B and the inspection image data from the image inspection mechanism 6B can be made equal. Thus, the image forming apparatus 1 of the second embodiment can perform the image inspection using the inspection image data from the image inspection mechanism 6B highly accurately.

<Third Embodiment>

Figure 9:
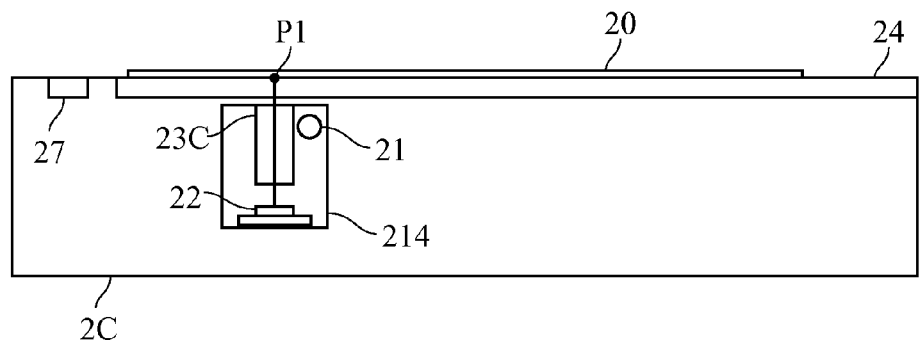
FIG. 9 is a schematic diagram showing a configuration of an image reading mechanism in an image forming apparatus according to a third embodiment of the present invention.
Figure 10:
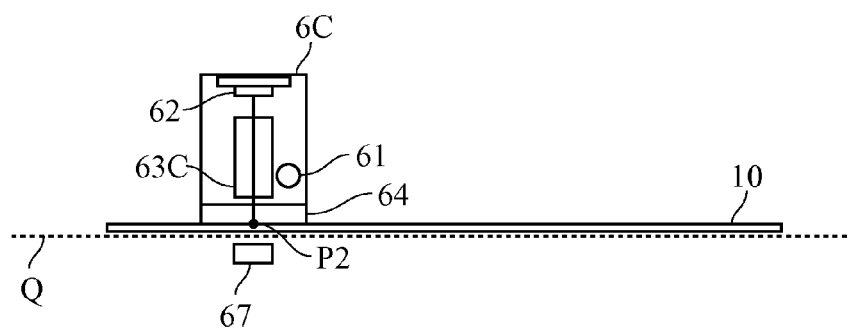
FIG. 10 is a schematic diagram showing a configuration of an image inspection mechanism in the image forming apparatus according to the third embodiment of the present invention.

An image forming apparatus of a third embodiment of the present invention is described below with reference to drawings. FIG. 9 is a diagram showing a configuration of an image reading mechanism in the image forming apparatus of the third embodiment. FIG. 10 is a diagram showing a configuration of an image inspection mechanism in the image forming apparatus of the third embodiment.

The image forming apparatus of the third embodiment has the configuration that is the same as that in the first embodiment except that the image reading mechanism and the image inspection mechanism are each formed of a contact same size optical system instead of the reducing optical system. An image reading mechanism 2C in FIG. 9 corresponds to the image reading mechanism 2 shown in FIGS. 1 and 4. An image inspection mechanism 6C in FIG. 10 corresponds to the image inspection mechanism 6 shown in FIGS. 1 and 4. In the configurations shown in FIGS. 9 and 10, portions that are the same as the counterparts in FIGS. 5 and 6 are denoted with the same reference numerals and will not be described in detail.

As shown in FIG. 9, the image reading mechanism 2C provided in the image forming apparatus 1 of the third embodiment includes the light source 21, the solid-state image sensing device 22, the document glass plate 24, the white reference plate 27, and an image forming lens 23C (corresponding to the image forming optical system 23 in FIG. 2) including a lens array in which image forming elements that form images for each pixel in the solid-state image sensing device 22 are arranged in the main-scanning direction. The light source 21, the solid-state image sensing device 22, and the image forming lens 23C are disposed in a slider unit 214 moved in the sub-scanning direction by the unillustrated movement mechanism such as a rail and a motor. The image reading mechanism 2C includes a casing having a surface provided with the document glass plate 24. In the casing, the white reference plate 27 is secured and the slider unit 214 is contained.

When the image of the document 20 is read in the image reading mechanism 2C having the configuration described above, irradiation light from the light source 21 is radiated onto the reading position P1 of the document 20 from the slider unit 214, and the reflected light as the radiated light reflected from the document 20 is made incident on the image forming lens 23C in the slider unit 214. Then, the reflected light from the document 20 transmits through the image forming lens 23C and thus the image of the reading position P1 of the document 20 is formed in the imaging region of the solid-state image sensing device 22. In the image reading mechanism 2C, as in the image reading mechanism 2A in the first embodiment (see FIG. 5), the reading operation is performed on the white reference plate 27 before the reading operation on the image on the document 20 for the shading correction in the image processing mechanism 8 (see FIG. 4).

As shown in FIG. 10, an image inspection mechanism 6C includes the light source 61, the solid-state image sensing device 62, the glass plate 64, the white reference plate 67, and an imaging forming lens 63C (corresponding to the image forming optical system 63 in FIG. 3) including the lens array that is the same as that in the image forming lens 23C. Unlike the image reading mechanism 2C, the image inspection mechanism 6C includes a casing having a surface on the side of the recording sheet conveyance path Q covered by the glass plate 64. In the casing, the light source 61, the solid-state image sensing device 62, and the image forming lens 63C are secured, and the white reference plate 67 is secured at a position right beneath the imaging forming lens 63C with the recording sheet conveyance path Q provided in between.

When the image of the recording sheet 10 passing through the recording sheet conveyance path Q is read in the image inspection mechanism 6C having the configuration described above, the reading position P2 of the recording sheet 10 is irradiated with the irradiation light from the light source 61, and the reflected light as the irradiation light reflected from the recording sheet 10 is made incident on the image forming lens 63C. The reflected light from the recording sheet 10 transmits through the image forming lens 63C, and thus the image of the reading position P2 of the recording sheet 10 is formed in an imaging region of the solid-state image sensing device 62. In the image inspection mechanism 6C, as in the image inspection mechanism 6A in the first embodiment (see FIG. 6), the reading operation is performed on the white reference plate 67 before the reading operation on the image on the recording sheet 10 for the shading correction in the image processing mechanism 8 (see FIG. 4).

In the third embodiment, the light sources 21 and 61 are formed of the light emitting elements having the same spectral characteristic as in the first and the second embodiments so that the spectral characteristics of the irradiation light beams on the document 20 and the recording sheet 10 can be made equal. The image forming lenses 23C and 63C are formed with the lens arrays having the same spectral transmittance, and thus the spectral characteristics of the light beams with which images are formed in the solid-state image sensing devices 22 and 62 can be made equal. If the solid-state image sensing devices 22 and 62 are formed of elements having the same spectral sensitivity characteristic, the document image data and the inspection image data can have the same spectral characteristic.

In each of the first to the third embodiments, the image reading mechanism 2 and the image inspection mechanism 6 have the same configuration. Alternatively, the image forming apparatus 1 including the image reading mechanism 2A may be provided with any one of the image inspection mechanisms 6B and 6C. The image forming apparatus 1 including the image reading mechanism 2B may be provided with any one of the image inspection mechanisms 6A and 6C. The image forming apparatus 1 including the image reading mechanism 2C may be provided with any one of the image inspection mechanisms 6A and 6B. As described above, the image reading mechanism 2 and the image inspection mechanism 6 having the different configurations can have the same spectral characteristic when the light sources 21 and 61, the solid-state image sensing devices 22 and 62, and the image forming optical systems 23 and 63 are formed of the components having the similar spectral characteristics.

<Fourth Embodiment>

Figure 11:
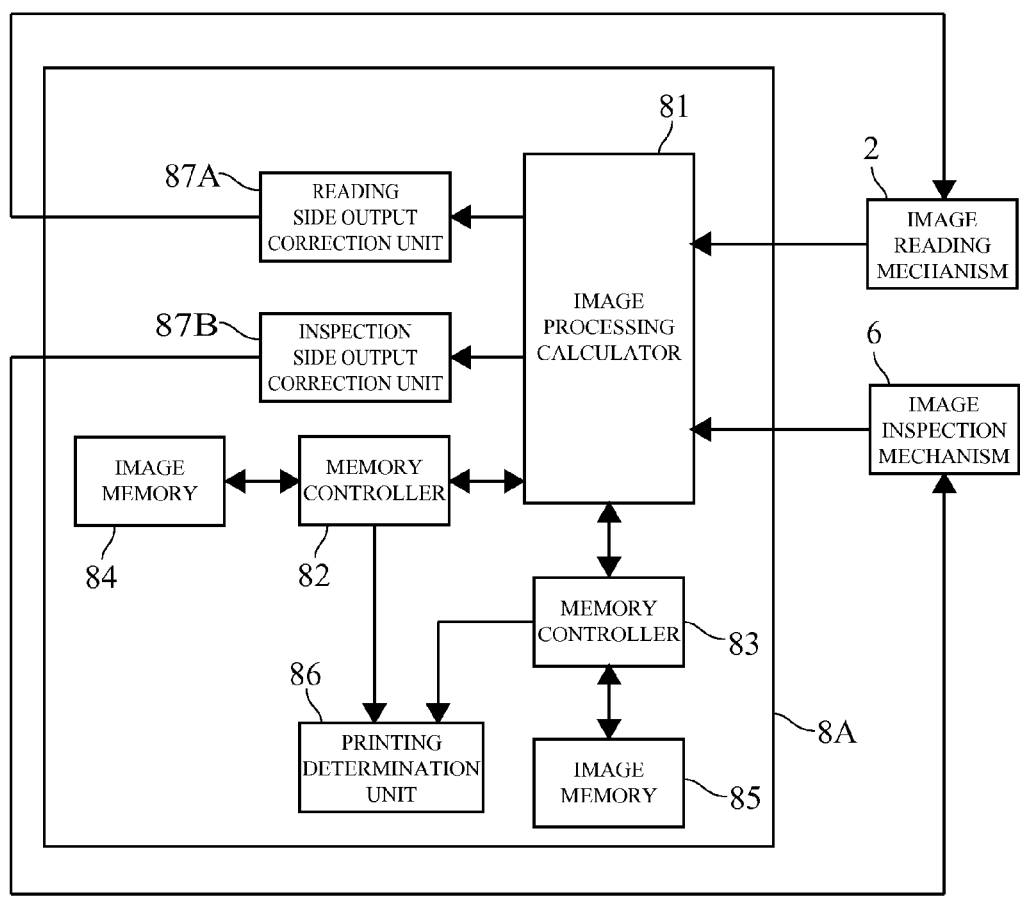
FIG. 11 is a block diagram showing a configuration of an image processing mechanism in an image forming apparatus according to a fourth embodiment of the present invention.

An image forming apparatus of a fourth embodiment of the present invention is described below with reference to a drawing. FIG. 11 is a block diagram showing a configuration of an image processing mechanism in the image forming apparatus of the fourth embodiment. The image forming apparatus of the fourth embodiment has the machine configuration shown in FIG. 1 and the functional configuration described in FIG. 4 and includes the image reading mechanism and the image inspection mechanism each having the configuration described in any one of the first to the third embodiments. In the configuration shown in FIG. 11, portions that are the same as the counterparts in FIG. 4 are denoted with the same reference numerals and will not be described in detail.

As shown in FIG. 11, an image processing mechanism 8A in the image forming apparatus 1 of the fourth embodiment includes the image processing calculator 81, the memory controllers 82 and 83, the image memories 84 and 85, the printing determination unit 86, a reading side output correction unit 87A that generates an output correction value for correcting the output from the solid-state image sensing device 22 and set an output gain of the image reading mechanism 2, and an inspection side output correction unit 87B that generates an output correction value for correcting the output from the solid-state image sensing device 62 and set an output gain of the image inspection mechanism 6. Other parts of the configuration of the image forming apparatus are the same as those in any one of the image forming apparatuses of the first to the third embodiments, and thus will not be described in detail.

In the image processing mechanism 8A having the configuration shown in FIG. 11, an electrical signal (hereinafter referred to as "document reference data") from the solid-state image sensing device 22 that performed the reading operation on the white reference plate 27 in the image reading mechanism 2 (corresponding to any one of the image reading mechanisms 2A to 2C in the first to the third embodiments) is inputted to the reading side output correction unit 87A through the image processing calculator 81. An electrical signal (hereinafter referred to as "inspection reference data") from the solid-state image sensing device 62 that performed the reading operation on the white reference plate 67 in the image inspection mechanism 6 (corresponding to any one of the image inspection mechanisms 6A to 6C in the first to the third embodiments) is inputted to the inspection side output correction unit 87B through the image processing calculator 81. The white reference plate 27 in the image reading mechanism 2 and the white reference plate 67 in the image inspection mechanism 6 are formed of the same component.

The reading side output correction unit 87A to which the document reference data is inputted compares a reference value stored in advance and the document reference data and calculates the output correction value for the solid-state image sensing device 22 based on the result of the comparison between the reference value and the document reference data. Here, the document reference data may be inputted to the reading side output correction unit 87A after being subjected to the shading correction in the image processing calculator 81 or may be inputted from the image processing calculator 81 without being subjected to the shading correction. After generating the output correction value for the solid-state image sensing device 22, the reading side output correction unit 87A sets the gain of an unillustrated amplifier provided on the output side of the solid-state image sensing device 22 based on the output correction value, and thus adjusts the output of the solid-state image sensing device 22.

The inspection side output correction unit 87B to which the inspection reference data is inputted compares a reference value stored in advance and the inspection reference data and calculates the output correction value for the solid-state image sensing device 62 based on the result of the comparison between the reference value and the inspection reference data. Like the document reference data, the inspection reference data may be inputted to the inspection side output correction unit 87B after being subjected to the shading correction in the image processing calculator 81 or may be inputted without being subjected to the shading correction. After generating the output correction value for the solid-state image sensing device 62, the inspection side output correction unit 87B sets the gain of an unillustrated amplifier provided on the output side of the solid-state image sensing device 62 based on the output correction value, and thus adjusts the output of the solid-state image sensing device 62.

In the reading side output correction unit 87A, the output correction value for the solid-state image sensing device 22 is calculated based on the ratio between the document reference data and the reference value. In the inspection side output correction unit 87B, the output correction value for the solid-state image sensing device 62 is calculated based on the ratio between the inspection reference data and the reference value. The respective amplifiers of the solid-state image sensing devices 22 and 62 have the gains set based on the output correction values therefor. Thus, the gradient reproducibility of the document image data generated by the electrical signal from the solid-state image sensing device 22 and the gradient reproducibility of the inspection image data generated by the electrical signal from the solid-state image sensing device 62 are made equal. Thus, the image forming apparatus of the fourth embodiment can perform the image inspection using the image reading mechanism and the image inspection mechanism with higher accuracy than the image forming apparatuses of the first to the third embodiments.

Each of the document reference data and the inspection reference data may be generated from an electrical signal output from a pixel at a predetermined position such as the pixel at the center of the solid-state image sensing device 22 or 62. Alternatively, each of the document reference data and the inspection reference data may be obtained from an average value of electrical signals of the pixels output from the solid-state image sensing device 22 or 62.

In the fourth embodiment, the document reference data and the inspection reference data are compared with the reference values stored in advance, and thus the output values of the solid-state image sensing devices 22 and 62 are adjusted. The present invention is not limited to the configuration described above. Any configuration in which the document reference data and the inspection reference data can be made equal can be employed. Thus, for example, the document reference data and the inspection reference data may be directly compared with each other so that an output correction value for equalizing the document reference data and the inspection reference data is calculated, and the gain of the amplifier of the solid-state image sensing device 22 may be set based on the output correction value. The output correction value for equalizing the document reference data and the inspection reference data may be calculated and the gain of the amplifier of the solid-state image sensing device 62 may be set based on the output correction value.

Furthermore, the output correction values are calculated based on the ratios between the document reference data and the reference value and the inspection reference data and the reference value. Alternatively, the output correction values may be calculated from the differences between the document reference data and the reference value and the inspection reference data and the reference value. When the output correction value obtained from the difference is used, offset between the electrical signals output from the solid-state image sensing devices 22 and 62 is calculated from the output correction value. The outputs of the solid-state image sensing devices 22 and 62 are adjusted by adjusting the offset removed from the outputs from the solid-state image sensing devices 22 and 62.

<Fifth Embodiment>

Figure 12:
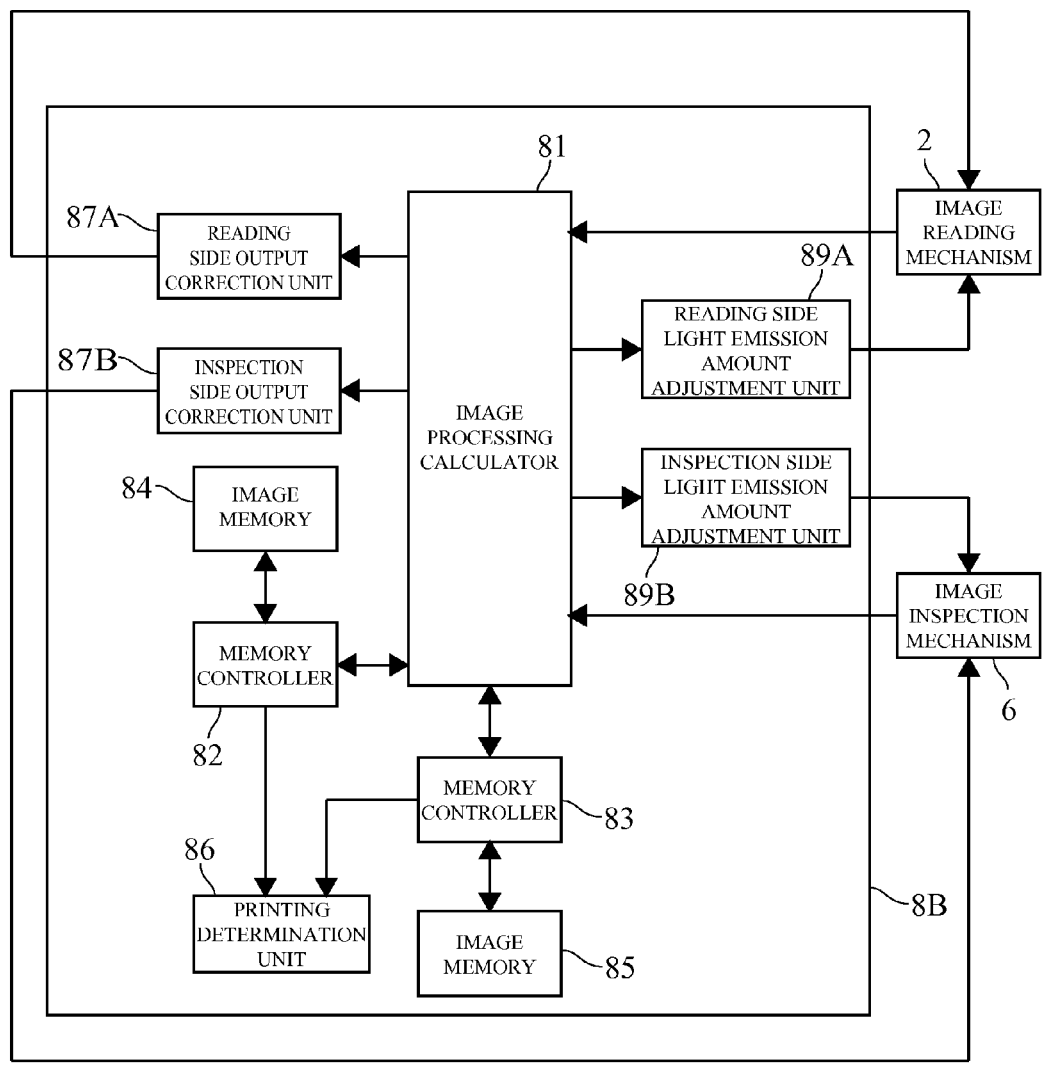
FIG. 12 is a block diagram showing a configuration of an image processing mechanism in an image forming apparatus according to a fifth embodiment of the present invention.

An image forming apparatus of a fifth embodiment of the present invention is described below with reference to drawings. FIG. 12 is a block diagram showing a configuration of an image processing mechanism in the image forming apparatus of the fifth embodiment. The image forming apparatus of the fifth embodiment has the machine configuration shown in FIG. 1 and the functional configuration described in FIG. 4 and includes the image reading mechanism and the image inspection mechanism each having the configuration described in any one of the first to the third embodiments. In the configuration shown in FIG. 12, portions that are the same as the counterparts in the image processing mechanism in the image forming apparatus of the fourth embodiment (see FIG. 11) are denoted with the same reference numerals and will not be described in detail.

As shown in FIG. 12, an image processing mechanism 8B in the image forming apparatus 1 of the fifth embodiment is formed by adding a reading side light emission amount adjustment unit 89A and an inspection side light emission amount adjustment unit 89B to the configuration of the image processing mechanism 8A (see FIG. 11) in the fourth embodiment. The reading side light emission amount adjustment unit 89A adjusts the brightness of the light source 21 of the image reading mechanism 2 (corresponding to any one of the image reading mechanisms 2A to 2C in the first to the third embodiments). The inspection side light emission amount adjustment unit 89B adjusts the brightness of the light source 61 of the image inspection mechanism 6 (corresponding to any one of the image inspection mechanisms 6A to 6C in the first to the third embodiments). The reading side light emission amount adjustment unit 89A stores a reading side reference value of the brightness of the light source 21 in advance and receives the document reference data through the image processing calculator 81. Similarly, the inspection side light emission amount adjustment unit 89B stores an inspection side reference value of the brightness of the light source 61 in advance and receives the inspection reference data through the image processing calculator 81.

The image processing mechanism 8B having the configuration described above generates the output correction values in the reading side output correction unit 87A and the inspection side output correction unit 87B based on the document reference data and the inspection reference data respectively, to adjust the outputs of the solid-state image sensing devices 22 and 62 as in the image processing mechanism 8A in the fourth embodiment (see FIG. 11). The image processing mechanism 8B performs brightness adjustment processing on the light sources 21 and 61 described below in addition to the output adjustment on the solid-state image sensing devices 22 and 62. Thus, the spectral characteristics of the document image data of the image reading mechanism 2 and the inspection image data of the image inspection mechanism 6 are made equal.

When the reading operation on the white reference plate 27 is performed in the image reading mechanism 2, in the image processing mechanism 8B, the document reference data is generated in the image processing calculator 81 and transmitted to the reading side light emission amount adjustment unit 89A. The reading side light emission amount adjustment unit 89A compares the reading side reference value stored therein in advance with the document reference data from the image processing calculator 81, to calculate a correction value for correcting the brightness of the light source 21. The correction value may be obtained based on the ratio or the difference between the document reference data and the reading side reference value. The reading side light emission amount adjustment unit 89A outputs a control signal for adjusting the brightness to the light source 21 based on the correction value thus calculated, and thus the brightness of the light source 21 is adjusted.

When the reading operation is performed on the white reference plate 67 in the image inspection mechanism 6, the inspection reference data is generated in the image processing calculator 81 and transmitted to the inspection side light emission amount adjustment unit 89B. The inspection side light emission amount adjustment unit 89B compares the inspection side reference value stored therein in advance with the inspection reference data as in the reading side light emission amount adjustment unit 89A, to calculate a correction value for correcting the brightness of the light source 61. The inspection side light emission amount adjustment unit 89B outputs a control signal for adjusting the brightness to the light source 61 based on the correction value thus calculated, and thus the brightness of the light source 61 is adjusted.

As described above, the reading side light emission amount adjustment unit 89A adjusts the brightness of the light source 21, and the inspection side light emission amount adjustment unit 89B adjusts the brightness of the light source 61. Thus, image data with no noise such as overexposure (saturation) and underexposure can be generated by the electrical signals output from the image reading mechanism 2 and the image inspection mechanism 6. Accordingly, the document image data from the image reading mechanism 2 and the inspection image data from the image inspection mechanism 6 can each be a high quality image. Thus, highly accurate image inspection using the image inspection mechanism 6 can be performed.

(First Example of Light Source)

Figure 13A:
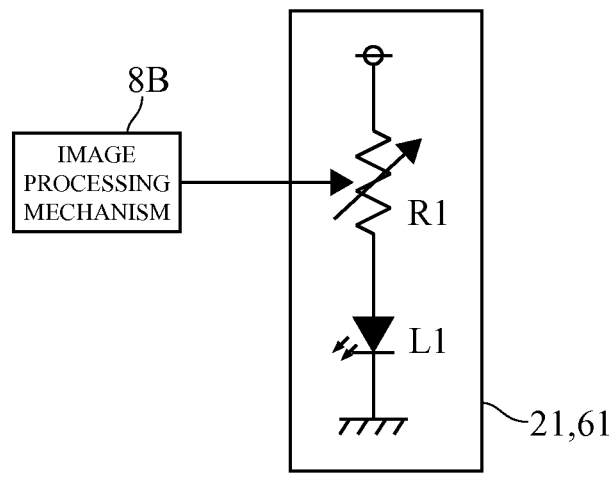
FIGS. 13A and 13B are diagrams showing configurations of a light source in the image forming apparatus according to the fifth embodiment of the present invention.

A first exemplary configuration of the light sources 21 and 61 of which the brightness is adjusted by the image processing mechanism 8B in the fifth embodiment will be described below. FIG. 13A is a circuit diagram showing a schematic configuration of the first exemplary configuration of the light source. The configuration illustrated in FIG. 13A is used both in the light sources 21 and 61.

As shown in FIG. 13A, the light sources 21 and 61 of the first example have a configuration in which an light emitting diode (LED) device L1 and a variable resistor R1 are connected in series between a power source potential and a ground potential. If the light sources 21 and 61 have such a configuration, the resistance of the variable resistor R1 is changed based on a control signal from each of the reading side light emission amount adjustment unit 89A and the inspection side light emission amount adjustment unit 89B. Thus, an amount of current that flows through the LED device L1 is adjusted so that the light emission amount of the LED device L1 is adjusted. Thus, the brightness of the light sources 21 and 61 is adjusted. In the exemplary configuration in FIG. 13A, the light emission amount of the LED device L1 is adjusted by controlling the amount of current that flows through the LED device L1. Alternatively, the light emission amount of the LED device L1 may be adjusted by controlling a voltage applied to the LED device L1.

(Second Example of Light Source)

Figure 13B:
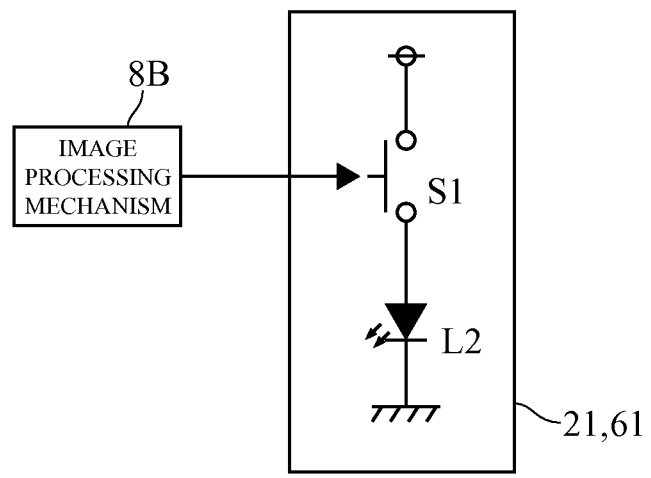

A second exemplary configuration of the light sources 21 and 61 of which the brightness is adjusted by the image processing mechanism 8B in the fifth embodiment will be described below. FIG. 13B is a circuit diagram showing a schematic configuration of a second exemplary configuration of the light source. The configuration illustrated in FIG. 13B is used both in the light sources 21 and 61.

As shown in FIG. 13B, in the second exemplary configuration of the light sources 21 and 61, an LED device L2 and a switching device S1 are connected in series between the power source potential and the ground potential. In such a configuration of the light sources 21 and 61, the ON/OFF timing (duty cycle) of the switching device S1 is changed based on a control signal from each of the reading side light emission amount adjustment unit 89A and the inspection side light emission amount adjustment unit 89B. Thus the LED device L2 is turned on and off, and the lighting time of the LED device L2 in a unit time is adjusted. Thus, the brightness of the light sources 21 and 61 is adjusted.

<Sixth Embodiment>

Figure 14:
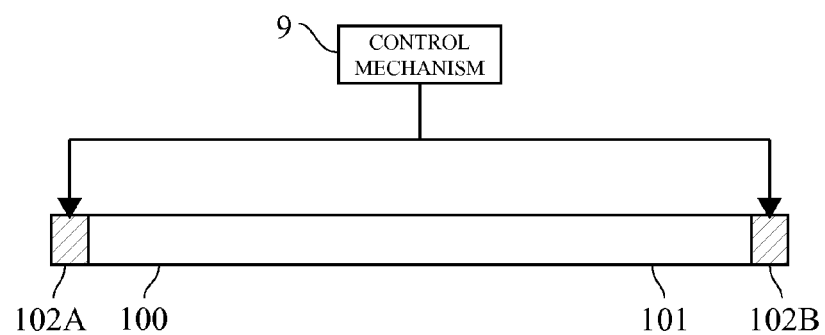
FIG. 14 is a schematic diagram showing a configuration of a light source in an image forming apparatus according to a sixth embodiment of the present invention.

An image forming apparatus of a sixth embodiment of the present invention is described below with reference to drawings. FIG. 14 is a schematic diagram showing a configuration of a light source of the image reading mechanism and the image inspection mechanism in the image forming apparatus of the sixth embodiment. The image forming apparatus of the sixth embodiment has the machine configuration shown in FIG. 1 and the functional configuration described in FIG. 4. The feature of the sixth embodiment lies in the light sources of the image reading mechanism and the image inspection mechanism. The light source as the feature of the sixth embodiment is described in detail, and the other configuration should be confirmed in the first to the fifth embodiments, and will not be described.

In the image forming apparatus 1 of the sixth embodiment, a light source 100 having a configuration shown in FIG. 14 is provided as each of the respective light sources 21 and 61 of the image reading mechanism 2 (see FIG. 2) and the image inspection mechanism 6 (see FIG. 3). The light source 100 has the configuration in which LED light sources 102A and 102B are respectively disposed on both ends of a light guide element 101 having an elongated shape. The LED light sources 102A and 102B used in the light source 100 may each be formed with one or more white LED device, and may be formed by combining red, blue, and green LED devices to emit white light.

The light source 100 having the configuration described above uses the LED light sources 102A and 102B as the light emission source, and thus can be formed as a light source with lower power consumption and heat generation compared with a case where a fluorescent light or a halogen lamp is used. When the light source that emits light through heat generation such as a fluorescent light or a halogen lamp becomes brighter, the color temperature thereof increases. Thus, the spectral characteristic changes depending on the brightness. In the LED light sources 102A and 102B, the electrical energy is converted into light through recombination of electrons and holes in a semiconductor, and thus does not emit light through heat generation. Thus, the brightness does not affect the spectral characteristic, and reduction of the amount of light over time can be smaller compared with the fluorescent light and the halogen lamp.

Thus, by using the light source 100 for each of the light sources 21 and 61 of the image reading mechanism 2 (see FIG. 2) and the image inspection mechanism 6 (see FIG. 3), the difference between the light sources 21 and 61 in the spectral characteristic can be reduced. Thus, the image inspection using the image reading mechanism 2 and the image inspection mechanism 6 can be performed with even higher accuracy.

In the sixth embodiment, the light guide elements 101 of the light sources 100 used for the respective light sources 21 and 61 of the image reading mechanism 2 (see FIG. 2) and the image inspection mechanism 6 (see FIG. 3) may have different diameters (thickness) in accordance with the reading width of the solid-state image sensing devices 22 and 62 in the main-scanning direction. Thus, in the configuration of the light source 100, a larger diameter of the light guide element 101 leads to the smaller number of times the light reflects from the LED light sources 102A and 102B. Thus, the light can be guided to a farther portion of the light guide element 101 in the longitudinal direction.

Thus, the light distribution characteristics of the light source 100 can be set in accordance with the reading width of the solid-state image sensing device by, for example, increasing the diameter of the light guide element 101 for a larger reading width in the solid-state image sensing device. Thus, in a case where the image reading mechanism 2 and the image inspection mechanism 6 read an image in the same sheet of paper in different directions (portrait and landscape), the light guide elements 101 of the light sources 100 respectively used in the light sources 21 and 61 are configured to be different from each other to correspond to the reading widths.

Figure 15:
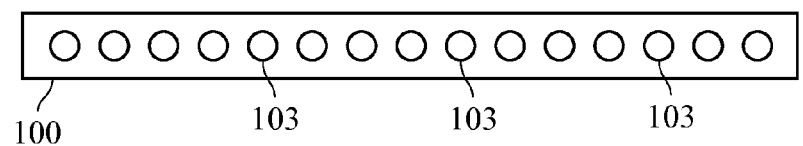
FIG. 15 is a schematic diagram showing another configuration of the light source in the image forming apparatus according to the sixth embodiment of the present invention.

In the sixth embodiment, the light source 100 includes the light guide element 101 and the LED light sources 102A and 102B as illustrated in FIG. 14. Alternatively, the light source 100 may include a plurality of LED devices 103 arranged in the main-scanning direction as shown in FIG. 15. The number of LED devices 103 to be arranged is changed in the light source 100 having the configuration illustrated in FIG. 15 in accordance with the reading speed of each of the image reading mechanism 2 (see FIG. 2) and the image inspection mechanism 6 (see FIG. 3). Thus, the brightness can be adjusted, and the interval between the LED devices 103 to be arranged may be adjusted to be suitable for the reading width of the solid-state image sensing device.

The amount of light reduces towards both ends of the solid-state image sensing devices 22 and 62 due to the optical characteristics of the image forming optical systems 23 and 63 (see FIGS. 2 and 3). Thus, the distance between two adjacent LED devices 103 closer to an end of the light source 100 may be set to be shorter, so that the amount of light from both ends of the light source 100 becomes larger than that from the center position.

In the sixth embodiment, the light source 100 is provided with the LED light sources 102A and 102B. Organic electroluminescent devices as a low power consumption and heat generation semiconductor light emitting element similar to the LED light source may be used instead of the LED light sources 102A and 102B. Here, the organic electroluminescent device may have an elongated shape so that the light guide element 101 can be omitted.

In the basic configuration and the first to the sixth embodiments, the description is given with an electrophotographic image forming apparatus as an example of the image forming apparatus of the present invention. However, the present invention is not limited to the electrophotographic image forming apparatus, and may be any other types of image forming apparatuses such as an inkjet image forming apparatus including the image forming mechanism as long as the image reading mechanism, the image inspection mechanism, and the image processing mechanism are provided.

In an embodiment of the present invention, the spectral characteristics of respective optical components of an image reading mechanism and an image inspection mechanism are set to be the same, and thus the image reading mechanism and the image inspection mechanism can have similar spectral characteristics. Thus, highly accurate image inspection can be performed on a recording sheet with an electrical signal from the image inspection mechanism. Thus, the printing state on the recording sheet can be accurately determined. Furthermore, a configuration is provided in which outputs from solid-state image sensing devices in the image reading mechanism and the image inspection mechanism can be corrected with data obtained through a reading out operation on a reference plate. Thus, the difference between read images in the spectral characteristics caused by the difference between the image reading mechanism and the image inspection mechanism in the reading width and the reading speed can be reduced. Moreover, a configuration is provided in which light emission amounts of light sources in the image reading mechanism and the image inspection mechanism can be adjusted with the data obtained through the reading out operation on the reference plate. Thus, the difference between the read images in the spectral characteristics caused by the difference between the image reading mechanism and the image inspection mechanism in the reading width and the reading speed can be reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image forming apparatus comprising:
an image reading mechanism configured to read an image from a document;
an image forming mechanism configured to print the image read by the image reading mechanism onto a recording sheet; and
an image inspection mechanism configured to read the image printed on the recording sheet in the image forming mechanism,
wherein the image reading mechanism and the image inspection mechanism each comprise:
a light source configured to irradiate a reading target with light; and
a solid-state image sensing device on which reflected light from the reading target is made incident, and configured to perform photoelectric conversion operation, and
wherein light emitting members respectively forming the light sources of the image reading mechanism and the image inspection mechanism have the same spectral characteristics.

2. The image forming apparatus according to claim 1, wherein photoelectric conversion elements forming the solid-state image sensing devices of the image reading mechanism and the image inspection mechanism have the same spectral characteristics.

3. The image forming apparatus according to claim 1,
wherein the image reading mechanism and the image inspection mechanism each further comprise an image forming optical system that forms an image in the solid-state image sensing device from the reflected light from the reading target, and
the image forming optical systems respectively provided in the image reading mechanism and the image inspection mechanism have the same spectral characteristics.

4. The image forming apparatus according to claim 1, wherein the light emitting members respectively forming the light sources of the image reading mechanism and the image inspection mechanism comprise semiconductor light emitting elements.

5. The image forming apparatus according to claim 1,
wherein the image reading mechanism and the image inspection mechanism each further comprise a reference plate irradiated with the light from the light source when variation of a light emission amount of the light source in a main-scanning direction is detected, and
wherein the reference plates are formed of the same material.

6. The image forming apparatus according to claim 5 further comprising an output correction unit configured to correct outputs from the image reading mechanism and the image inspection mechanism,
wherein the image reading mechanism outputs an electrical signal obtained through photoelectric conversion in the solid-state image sensing device based on irradiation light on the reference plate from the light source as first reference data,
wherein the image inspection mechanism outputs an electrical signal obtained through photoelectric conversion in the solid-state image sensing device based on irradiation light on the reference plate from the light source as second reference data, and
the output correction unit calculates a correction value for equalizing the first reference data and the second reference data and corrects the outputs from the image reading mechanism and the image inspection mechanism based on the correction value.

7. The image forming apparatus according to claim 5 further comprising:
a first light emission amount adjustment unit configured to adjust upon receiving an electrical signal obtained through photoelectric conversion in the solid-state image sensing device based on irradiation light on the reference plate from the light source in the image reading mechanism, a light emission amount from the light source of the image reading mechanism based on the electrical signal; and
a second light emission amount adjustment unit configured to adjust upon receiving an electrical signal obtained through photoelectric conversion in the solid-state image sensing device based on irradiation light on the reference plate from the light source in the image inspection mechanism, a light emission amount from the light source of the image inspection mechanism based on the electrical signal.

* * * * *